United States Patent [19]

Kamada et al.

[11] 4,111,892

[45] Sep. 5, 1978

[54] REINFORCED FIRE RETARDANT RESIN COMPOSITION IMPROVED IN ELECTRICAL CHARACTERISTICS

[75] Inventors: Kazumasa Kamada; Masafumi Hongo, both of Otake, Japan

[73] Assignee: Mitsubishi Rayon Co., Ltd., Tokyo, Japan

[21] Appl. No.: 797,819

[22] Filed: May 18, 1977

[30] Foreign Application Priority Data

May 24, 1976 [JP] Japan .................................. 51-59792
Sep. 14, 1976 [JP] Japan ................................ 51-110206

[51] Int. Cl.$^2$ .......................... C08K 3/20; C08K 3/36; C08K 5/02
[52] U.S. Cl. .................................... 260/40 R; 260/873
[58] Field of Search ............. 260/40 R, DIG. 24, 873

[56] References Cited

U.S. PATENT DOCUMENTS

| | | | |
|---|---|---|---|
| 3,824,209 | 7/1974 | Anderson ..................... | 260/40 R X |
| 3,909,485 | 9/1975 | Honga et al. ................ | 260/DIG. 24 |
| 3,937,757 | 2/1976 | Sezdl et al. ........................... | 260/873 |
| 3,963,669 | 6/1976 | Wurmb et al. .............. | 260/DIG. 24 |
| 4,035,333 | 7/1977 | Kamada et al. .................... | 260/40 R |

OTHER PUBLICATIONS

R. Iler, The Colloid Chemistry of Silica and Silicates (1955), pp. 154–155.

*Primary Examiner*—Sandra M. Person
*Attorney, Agent, or Firm*—Oblon, Fisher, Spivak, McClelland & Maier

[57] ABSTRACT

A reinforced fire retardant resin composition of improved electrical characteristics, which comprises:
a base resin of polytetramethylene terephthalate alone or in admixture with at least one other polymer, a fire retardant combination of a halogen containing compound and an antimony compound, hydrated silica and a reinforcing filler, wherein said halogen containing compound is present in an amount of 3–50 parts by wt. per 100 parts by weight of said base resin, said antimony compound is present in an amount such that the weight ratio of the halogen containing compound to the antimony compound ranges from 0.25 to 6 and the content of said hydrated silica ranges from 0.5 – 10 wt. % of the total resin composition.

10 Claims, No Drawings

REINFORCED FIRE RETARDANT RESIN COMPOSITION IMPROVED IN ELECTRICAL CHARACTERISTICS

BACKGROUND OF THE INVENTION

1. Field of the Invention

The present invention relates to a reinforced fire retardant resin composition which is mainly composed of polytetramethylene terephthalate and which possesses improved electrical characteristics.

2. Description of the Prior Art

It is expected that polytetramethylene terephthalate reinforced with glass fibers will be used in a variety of industrial applications because of its balanced properties, especially for use in the fabrication of electrical parts because of its excellent insulating properties. However, such terephthalate materials, especially when they are used in the fabrication of electrical parts, are subject to inflammability problems. It is especially when the polytetramethylene terephthalate materials are used in electrical applications that they should be fire retardant.

Some methods for rendering glass fiber-reinforced polytetramethylene terephthalate materials fire retardant have been proposed. One technique which has been proposed employs various halogen compounds in combination with antimony trioxide as a fire retarder combination.

The combined use of halogen compounds and antimony trioxide has succeeded in imparting a degree of fire retardancy to reinforced polytetramethylene terephthalate. At the same time, however, the electrical characteristics, especially the arc resistance and tracking resistance of the terephthalate materials is an extremely serious problem with these fire retardant materials. Accordingly, an improved method for rendering polytetramethylene terephthalate materials fire retardant is essential.

It has been proposed that the arc resistance of a fire retardant polytetramethylene terephthalate composition reinforced with glass fibers and containing various halogen compounds and antimony compounds as fire retardants can be improved by adding sodium antimonate and talc or boron nitride to the composition. Although the arc resistance of the composition can be improved by the addition of these fire retardant compounds, the tracking resistance can not be sufficiently improved.

Furthermore, the addition of needle-like calcium metasilicate to reinforced polytetramethylene terephthalate materials has also been proposed to improve the arc resistance of polytetramethylene terephthalate. However, in this method, calcium metasilicate must be added to the terephthalate material in an extremely great amount. Moreover, the additive can not be practically used in the compositions which contain a fire retarder. It has also been proposed to add asbestos fibers which have a great L/D to prevent dripping of the terephthalate composition in a flame to retard combustion. However, the fire retardant resin compositions to which asbestos fibers are added cause the formation of black stains on the surface of products molded from the composition which markedly reduces the commercial value of the product. Moreover, the addition of anhydrous silica such as fumed colloidal silica or silicates to terephthalate compositions has also been proposed for the same purpose as the addition of asbestos fibers. These compounds have the effect of preventing dripping of molten material when exposed to a flame. However, the tracking resistance of the composition of the present invention cannot be improved. Thus, no polytetramethylene terephthalate resin composition is currently available which contains a reinforcing filler and which is fire retardant while still retaining the excellent electrical characteristics of polytetramethylene terephthalate, especially the arc resistance and tracking resistance characteristics.

SUMMARY OF THE INVENTION

Accordingly, one object of the present invention is to provide a flame retardant polytetramethylene terephthalate composition which retains the excellent mechanical and electrical characteristics of polytetramethylene terephthalate.

Another object of the present invention is to provide a polytetramethylene terephthalate composition of good tracking and arc resistant properties.

Briefly, these objects and other objects of the present invention as hereinafter will become readily apparent can be attained by a polytetramethylene terephthalate composition which contains a halogen compound and an antimony compound as a fire retardant combination, a reinforcing filler and hydrated silica.

DETAILED DESCRIPTION OF THE PREFERRED EMBODIMENTS

As the result of intensive research in an attempt to improve the fire retardancy of polytetramethylene terephthalate containing reinforcing fillers while not reducing the tracking resistance and arc resistance of the terephthalate, it has been found that when hydrated silica is added together with a halogen compound and an antimony compound as a fire retarder combination to polytetramethylene terephthalate to which a reinforcing agent is added, the tracking resistance and arc resistance, especially the former property, are improved and the composition exhibits excellent flame retardancy while retaining the good mechanical properties of the terephthalate material. this is a completely unexpected result because polytetramethylene terephthalate contains an ester bond which would be expected to be hydrolyzed by water. Thus, it has been presumed that when a compound containing bound water is added to polytetramethylene terephthalate compositions, the terephthalate decomposes resulting in serious deterioration of the excellent inherent mechanical properties of the terephthalate. Because of this belief hitherto the additives which have been proposed to be added to polytetramethylene terephthalate for various purposes have been limited to anhydrous materials or those materials which contain only small amounts of bound water or those which have extremely high dehydrating temperatures.

Contrary to this belief, it has now been found, that when hydrated silica is used as an additive for polytetramethylene terephthalate in the present invention no reduction in mechanical properties of the terephthalate occurs. Moreover, the tracking resistance and arc resistance can be improved. This effect can only be obtained by the addition of hydrated silica. Anhydrous silica and the like do not improve the arc resistance and tracking resistance of polytetramethylene terephthalate compositions. The reason for this has not yet been fully clarified, but presumably it is attributable to the fact that anhydrous silica and hydrated silica are different both physically and chemically in their surface states.

As a result of the further research conducted on techniques of improving electrical properties of polytetramethylene terephthalates, it has also been found that when hydrated silica and talc are added in combination in a specific ratio to the terephthalate when a halogen compound and antimony compounds are added as a fire retardant combination to polytetramethylene terephthalate to which also is added talc and glass fibers as reinforcing fillers, the arc resistance and tracking resistance of the terephthalate are synergistically improved and excellent fire retardance is retained. Thus, the present invention also provides a composition which not only posesses excellent tracking resistance at commercial voltages, but also which can be widely used in electrical parts such as secondary voltage circuits to which a high voltage is applied.

More specifically, the reinforced fire retardant resin composition of the present invention of improved electrical characteristics comprises polytetramethylene terephthalate, a halogen compound and an antimony compound as a fire retardant combination, hydrated silica and a reinforcing filler. The content of the halogen compound in the composition ranges from 3–50 parts by weight per 100 parts by weight of the polytetramethylene terephthalate, while the weight ratio of halogen compound to antimony compound is 0.25 – 6 and the content of the hydrated silica is 0.5 – 10% by weight of the total resin composition.

The polytetramethylene terephthalate used in the present invention may be synthesized, for example, from 1,4-butanediol and dimethyl terephthalate. However, a polymer obtained by copolycondensation in the presence of a small amount of a diol such as ethylene glycol, 1,3-propanediol and a dicarboxylic acid such as isophthalic acid, if desired, may also be prepared. Moreover, mixtures of at least 60% by weight of a polytetramethylene terephthalate so obtained and up to 40% by weight of at least one other polymer such as polystyrene, polymethyl methacrylate, polycarbonate, polyethylene terephthalate, ABS resin, AS resin, AAS resin, polyethylene, polypropylene, nylon resin, and the like are also included within the scope of the polytetramethylene terephthalate material referred to in the present invention.

The intrinsic viscosity [$\eta$] of the terephthalate polymer is preferably in the range of 0.4 – 3.0 in a mixed solvent of tetrachloroethane/phenol in equal amounts at 25° C, and a particular preferred range is 0.6 – 2.0 when the mechanical properties of the final molded products and the flow workability at the injection molding step are taken into consideration.

Suitable halogen compounds which are used as a fire retardant component in the present invention, include various compounds such as aromatic halogen substituted compounds, aliphatic halogen substituted compounds, polymers of such compounds and the like. Specific examples of these compounds are hexabromobenzene, tetrabromobisphenol A and derivatives thereof; tetrabromophthalic anhydride, decabromodiphenylether, hexabromodiphenylether, trisdibromophenyl phosphate, tris 2,3-dibromopropyl phosphate, cycloaliphatic compounds such as $C_{14}H_4Cl_{12}O$, $C_{17}H_8Cl_{12}$, $C_{18}H_{12}Cl_{12}$ and the like; and polymers such as brominated epoxy resin, brominated polyester resin, and the like. As a matter of fact, any halogen compounds which are stable at the molding temperatures of polytetramethylene terephthalate may be used. In the case of the electrical components in which the present polytetramethylene terephthalate composition is used which are subjected to a temperature higher than 100° C for a long time, it is preferable to use aliphatic cyclic compounds or decabromobiphenylether and said brominated epoxy resin in combination or to use a polymer such as brominated epoxy resin, brominated polyester resin, or the like, as the halogen compound because the use of these compounds substantially decreases the tendency of the fire retardant to appear on the surface of the molded product.

The amount of the halogen compound employed in the composition depends on the degree of fire retardancy desired, but it is generally 3 – 50 parts by weight, preferably 5–30 parts by weight per 100 parts by weight of the polytetramethylene terephthalate. If the amount of the halogen compound employed is less than 3 parts by weight, a sufficient fire retarding effect can not be attained. If the amount used is greater than 50 parts by weight, the resin characteristics are adversely affected.

Suitable antimony compounds useful as a component of the fire retardant combination include antimony trioxide and sodium antimonate. The amount of the antimony compound employed is such that the weight ratio of halogen compound/antimony compound is 0.25 – 6. If the weight ratio is less than 0.25, the mechanical properties of the composition are reduced because of the presence of relatively great amounts of the antimony compound. If the ratio is greater than 6, the synergistic effect of the antimony compound on fire retarding is decreased.

The hydrated silica used in the present invention is represented by the general formula $SiO_2 \cdot nH_2O$ and it has a water content of about 3–12% by weight and a $SiO_2$ content of about 80 — about 92% by weight and ordinarily contains some impurities such as metal oxides and the like. The hydrated silica used is prepared by a technique generaly referred to as the wet method, e.g., the decomposition of sodium silicate or an alkaline earth metal silicate with an acid. The amount of the hydrated silica added to the composition ranges from 0.5 – 10% by weight, preferably 1 – 8% by weight of the total resin composition including reinforcing fillers. If the amount of the hydrated silica is less than 0.5% by weight the improvement in electrical characteristics expected of the composition is not achieved, and if it is present in amounts greater than 10% by weight, the molding operability is adversely affected which is quite undesirable.

The reinforcing fillers in the present composition can assume a variety of various shapes such as fibrous, plate-like shapes, and the like. Suitable examples thereof include glass fibers, glass foils, whiskers, asbestos fibers, mica powders, talc, boron nitride, and the like. The glass fibers are most generally used among the fillers mentioned and the type used have no special limitations in kind and the method of addition. Both the roving type and short fiber dispersion type may be employed, but the latter is more preferable considering productibility factors of the fiber. In this case, when the mixing operation, the abrasion of the molding machines and the cutting of the material in the molding step are considered, fibers of about 0.4–6 mm are particularly preferred, but it is sufficient that the length of the glass fibers in the final molded product be about 0.1 – 2mm. Commercially available glass fibers which have been subjected to various treatments can be used as they are.

The total amount of reinforcing filler added such as glass fibers, or the like, is preferably 3 - 50% by weight of the total resin composition. If the amount is more than 50% by weight, the moldability in terms of flow workability is reduced. If the filler is present in amounts less than 3% by weight, the reinforcing effect is insufficient.

when talc is used as a reinforcing filler with other reinforcing fillers such as glass fibers, it is important to blend the talc and hydrated silica at a weight ratio of talc/hydrated silica of 10/1 - ⅓, preferably 7/1 - ½ and to add the talc in an amount of 0.5 - 20% by weight of the total resin composition. If the mixing ratio of talc and hydrated silica is more than 10/1 or less than ⅓, the desired synergistic effect of talc and hydrated silica for the improvement of electrical characteristics of the resulting composition is not achieved to the extent possible. Furthermore, if the amount of talc is less than 0.5% by weight, the effect of the talc in the composition is insufficient. If the amount of talc is greater than 20% by weight, the flow workability and mechanical properties of the composition deteriorate because of the interaction between talc and the other reinforcing agent.

Various commercially available talcs may be used, but those having an average particle size of 20 μ or less are preferred. If the particle size is greater than 20 μ, dispersibility decreases and mechanical properties are apt to deteriorate.

The reinforcing agent may be added to the composition by any ordinary method but considering such factors as operability and the like, it is preferably added when the halogen compound, antimony compound, hydrated silica, and the like are added to the polytetramethylene tetephthalate chips.

Besides the reinforcing filler, various modifiers such as fluidity improvers, stabilizers against light or heat, dyes, pigments, and the like may also be added to the composition of the present invention.

Having generally described this invention, a further understanding can be obtained by reference to certain specific examples which are provided herein for purposes of illustration only and are not intended to be limiting unless otherwise specified.

EXAMPLE 1

Polytetramethylene terephthalate (referred to as PTMT hereinafter) having an intrinsic viscosity ($\eta$) = 0.95 as measured in a mixed solvent of tetrachloroethane and phenol in equal amounts at 25° C, commercially available glass fibers having a length of 3mm and a diameter of about 10 μ, a fire retardant (A) having the formula,

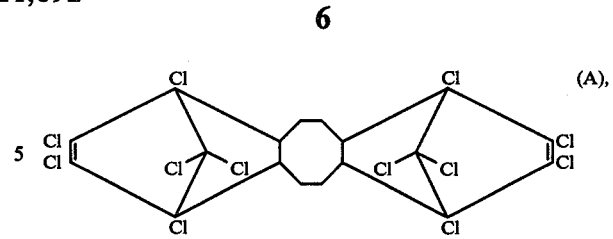

antimony trioxide and hydrated silica powder having a water content of about 8% were blended in the blending ratios shown in Table 1 for about 5 minutes by a V-shaped blender and the resultant blend was fed to an extruder of 40φ at a cylinder temperature of 220°-260° C. The strand-like material obtained was pelletized to obtain the desired composition. The pellets were injection molded at a cylinder temperature of 250° C and a mold temperature of 100° C to obtain a molded product for evaluation. The product has an extremely good appearance.

This molded product was subjected to tracking resistance tests in accordance with the IEC method which uses a 0.1% aqueous solution of $NH_4Cl$ and platinum electrodes. The arc resistance was tested in accordance with the procedure of ASTM D495. The tensile strength was tested in accordance with the procedure of ASTM D638. The bending strength was tested in accordance with the procedure of ASTM D790, and the fire retardance (thickness 1/16 inch) in accordance with the procedure of UL-94. The results are shown in Table 1.

Comparative Examples 1-7 show the results obtained when only the hydrated silica in the composition of the present invention was replaced with another type of additive or was omitted. The samples were produced and evaluated in the same manner as the example of the present invention mentioned above.

In comparative Example 4, talc which is effective when used with hydrated silica in the present invention, was used in place of hydrated silica. The use of talc alone does not improve the tracking resistance.

When asbestos fibers were added to the compositions as shown in Comparative Example 3, black stains appeared on the surface of the molded product and a product of only unsatisfactory appearance was obtained. In Comparative Example 6 where aluminum silcate was added, the heat stability of the product was inferior and the molded product was colored. This is highly undesirable.

As is clear from Table 1, the composition of the present invention exhibits improved tracking resistance, while at the same time exhibiting the good mechanical properties similar to those compositions which contain no hydrated silica as well as excellent fire retardancy.

TABLE 1

| | COMPOSITION | | | | |
|---|---|---|---|---|---|
| | PTMT kg (part by weight) | Glass fibers kg (weight %) | Fire retarder (A) kg (part by weight) | Antimony trioxide kg(weight ratio) | Additive kg (weight%) |
| Example 1 | 5.16 kg (100) | 3.0 kg (30) | 0.93 kg (18) | 0.51 kg (1.8) | Hydrated silica 0.4 kg (4 %) |
| Comparative Example 1 | 5.16 kg (100) | 3.0 kg (30) | 0.93 kg (18) | 0.51 kg (1.8) | anhydrous silica 0.4 kg (4 %) |
| Comparative Example 2 | " | " | " | " | Potassium titanate 0.4 kg (4 %) |
| Comparative Example 3 | " | " | " | " | Asbestos fibers 0.4 kg (4 %) |
| Comparative Example 4 | " | " | " | " | Talc 0.4 kg (4 %) |
| Comparative Example 5 | " | " | " | " | Calcium metasilicate 0.4 kg (4 %) |
| Comparative | " | " | " | " | Aluminum silicate |

TABLE 1-continued

| | | | | | 0.4 kg (4%) |
|---|---|---|---|---|---|
| Example 6 | | | | | |
| Comparative Example 7 | 5.47 kg (100) | " | 0.98 kg (18) | 0.55 kg (1.8) | — |

| | Tracking resistance I E C CTI volt | Arc resistance ASTMD495 (second) | Tensile strength ASTMD638 (kg/cm$^2$) | Bending strength ASTMD790 (kg/cm$^2$) | Fire retardancy UL - 94 (1/16") |
|---|---|---|---|---|---|
| Example 1 | 250 | 13 | 1050 | 1630 | V - 0 |
| Comparative Example 1 | 200 | 10 | 1030 | 1620 | V - 0 |
| Comparative Example 2 | 200 | 11 | 1060 | 1650 | V - 0 |
| Comparative Example 3 | 210 | 15 | 1020 | 1700 | V - 0 |
| Comparative Example 4 | 210 | 14 | 1000 | 1610 | V - 0 |
| Comparative Example 5 | 200 | 10 | 1020 | 1630 | V - 0 |
| Comparative Example 6 | 190 | 10 | 990 | 1580 | V - 0 |
| Comparative Example 7 | 200 | 10 | 1040 | 1650 | V - 0 |

EXAMPLES 2 – 4

PTMT having an intrinsic viscosity [$\eta$] = 1.05, commercially available chopped strand glass fibers 3 mm in length, the fire retarder (A) of Example 1, antimony trioxide and hydrated silica having a water content of about 8% were blended in the ratios shown in Table 2 and the compositions were obtained from an extruder in the same manner as described in Example 1. These compositions were injection molded and the tracking resistance and bending strength of the molded products were evaluated.

As is clear from Table 2, when the amount of hydrated silica present was 0.3% by weight, the improvement in electrical characteristics was insufficient. When the amount of hydrated silica was 15% by weight, the processing of the composition in the feed zone was unacceptable and the extrusion of the composition was impossible because of the substantial bulkiness of the hydrated silica.

TABLE 2

| | COMPOSITION | | | | | Tracking resistance CTI volt | Bending strength ASTM D 790 (kg/cm$^2$) | Note |
|---|---|---|---|---|---|---|---|---|
| | PTMT kg (part by weight) | Glass fibers kg (weight %) | Fire retarder (A) kg (part by weight) | Antimony trioxide kg (weight ratio*) | Hydrated silica kg (weight %) | | | |
| Comparative Example 8 | 5.58 kg (100) | 3.0 kg (30) | 1.12 kg (20) | 0.27 kg (4.0) | 0.03 kg (0.3) | 180 | 1700 | |
| Example 2 | 5.52 kg (100) | " | 1.10 kg (20) | 0.28 kg (4.0) | 0.1 kg (1) | 200 | 1750 | |
| Example 3 | 5.20 kg (100) | " | 1.04 kg (20) | 0.26 kg (4.0) | 0.5 kg (5) | 230 | 1730 | |
| Example 4 | 4.96 kg (100) | " | 0.99 kg (20) | 0.25 kg (4.0) | 0.8 kg (8) | 270 | 1720 | |
| Comparative Example 9 | 4.40 kg (100) | " | 0.88 kg (20) | 0.22 kg (4.0) | 1.5 kg (15) | — | — | Extrusion was impossible |

*Weight ratio; Ratio to fire retardant (A)

EXAMPLES 5 –7

PTMT having an intrinsic viscosity [$\eta$] = 1.15, 3.0 kg of commercially available chopped strand glass fibers 3 mm in length, a fire retardant composition comprising a halogen compound as shown in Table 3 and a brominated epoxy resin and an antimony compound and hydrated silica were blended in the blending ratios shown in Table 3. Compositions were obtained therefrom by an extruder.

Each of the compositions obtained was injection molded to obtain molded products for evaluation. The results of the evaluation are shown in Table 3.

As is clear from Table 3, the molded products obtained from the compositions of the present invention had excellent tracking resistance and arc resistance and exhibited excellent fire retardancy.

TABLE 3

| | COMPOSITION* | | | | | Tracking resistance CTI volt | Arc resistance (second) | Fire retardancy UL-94 (1/16") |
|---|---|---|---|---|---|---|---|---|
| | PTMT kg (part by weight) | Halogen compound kg (part by weight) | Brominated epoxy resin kg (part by weight) | Antimony compound kg (weight ratio) | Hydrated silica kg (weight %) | | | |
| Example 5 | 5.2 kg (100) | Decabromodiphenyl-ether 0.52 kg (10) | 0.26 kg (5) | Antimony trioxide 0.52 kg (1.5) | 0.5 kg (5) | 230 | 64 | V-0 |
| Example 6 | 5.08 kg (100) | Tris, 2,3 dibromo-propyl phosphate 0.76 kg (15) | 0.25 kg (5) | Sodium antimonate 0.51 kg (2.0) | 0.4 kg (4) | 240 | 78 | V-0 |
| Example 7 | 5.15 kg (100) | — | 1.13 kg (22) | Antimony trioxide 0.42 kg (2.8) | 0.3 kg (3) | 230 | 60 | V-0 |
| Comparative | 5.6 kg | Decabromodi- | 0.28 kg | Antimony | — | 190 | 18 | V-0 |

TABLE 3-continued

| | COMPOSITION* | | | | | Tracking resistance CTI volt | Arc resistance (second) | Fire retardancy UL-94 (1/16") |
|---|---|---|---|---|---|---|---|---|
| | PTMT kg (part by weight) | Halogen compound kg (part by weight) | Brominated epoxy resin kg (part by weight) | Antimony compound kg (weight ratio) | Hydrated silica kg (weight %) | | | |
| Example 10 | (100) | phenyl-ether 0.56 kg (10) | | (5) | trioxide 0.56 kg (1.5) | | | |

*3.0 kg (30 weight %) of glass fibers were present in each composition

EXAMPLES 8–11

PTMT of intrinsic viscosity $[\eta] = 0.95$ which was used in Example 1, glass fibers 3 mm in length, talc, fire retarder (A), brominated epoxy resin, antimony trioxide and hydrated silica were blended in the blending ratios shown in Table 4 and compositions within the scope of the present invention were obtained through an extruder in the same manner as described in Example 1. Each of these compositions was injection molded and the molded products were evaluated with respect to arc resistance, and the like. The results are shown in Table 4.

Comparative Examples 11 show the results obtained when the blending ratio of talc/hydrated silica was outside the range of the present invention.

As is clear from the data in Table 4, when talc is jointly used with hydrated silica, it is necessary that the blending ratio (in weight) of talc to hydrated silica be within the range of 10/1 – ⅓.

EXAMPLES 12–13

To 100 parts by weight of PTMT having an intrinsic viscosity $[\eta]$ of 0.82 were added 15 parts by weight of a halogen compound as shown in Table 5, 5 parts by weight of antimony trioxide, 20% by weight (based on the total resin composition) of glass fibers 3 mm in length and a mixture of talc having an average particle size of 11 $\mu$ and hydrated silica in the ratios and amounts shown in Table 5. The mixtures were blended. Each blend was extruded in the same manner as described in Example 1 and several compositions were obtained.

Each of the obtained compositions was injection molded in the same manner as described in Example 1 to obtain molded products for evaluation. The results of the evaluation are shown in Table 5.

In Comparative Example 15 the amounts of talc and hydrated silica were too large which resulted in poor processing in the feed zone and the desired pelletized composition could not be obtained.

As is clear from Table 5, it is necessary in order to sufficiently improve the electric characteristics of the composition that the amount of hydrated silica range from 0.5 – 10% by weight even when talc and silica hydrate are used together.

TABLE 4

| | COMPOSITION | | | | | | |
|---|---|---|---|---|---|---|---|
| | PTMT kg (part by weight) | Glass fibers kg (weight %) | Talc/Hydrated silica weight ratio | Talc/Hydrated silica kg/kg (weight %/weight %) | Fire Retarder (A)* kg (part by weight) | Brominated epoxy resin kg (part by weight) | Antimony trioxide kg (weight ratio) |
| Comparative Example 11 | 4.62 kg (100) | 3.0 kg (30) | 20/1 | 0.952/0.048 (9.52/0.48) | 0.46 kg (10) | 0.46 kg (10) | 0.46 kg (2.0) |
| Example 8 | (") " | (") " | 10/1 | 0.909/0.091 (9.09/0.91) | (") " | (") " | (") " |
| Example 9 | (") " | (") " | 3/1 | 0.75/0.25 (7.5/2.5) | (") " | (") " | (") " |
| Example 10 | (") " | (") " | 3/4 | 0.429/0.571 (4.29/5.71) | (") " | (") " | (") " |
| Example 11 | (") " | (") " | 1/3 | 0.25/0.75 (2.5/7.5) | (") " | (") " | (") " |
| Comparative Example 12 | 5.38 kg (") | (") " | — | — | 0.54 kg (") | 0.54 kg (") | 0.54 kg (") |

*Fire retarder (A) : Same as that used in Example 1

| | Arc resistance ASTM D495 (second) | Bending strength ASTM D790 (kg/cm²) | Fire retardance UL - 94 (1/16") |
|---|---|---|---|
| Comparative Example 11 | 30 | 1790 | V - 0 |
| Example 8 | 108 | 1780 | V - 0 |
| Example 9 | 105 | 1830 | V - 0 |
| Example 10 | 100 | 1770 | V - 0 |
| Example 11 | 80 | 1740 | V - 0 |
| Comparative Example 12 | 17 | 1850 | V - 0 |

TABLE 5

| | COMPOSITION | | | | |
|---|---|---|---|---|---|
| | Halogen compound | | Antimony trioxide (weight ratio) | Talc/Hydrated Silica | |
| | Kind | Amount (part by weight) | | weight ratio | Talc/Hydrated silica (weight %/weight %) |
| Comparative Example 13 | Brominated epoxy resin | 15 | (3.0) | 3/1 | 0.75/0.25 |

TABLE 5-continued

| | | | | | |
|---|---|---|---|---|---|
| Example 12 | Brominated epoxy resin | 15 | (3.0) | 3/1 | 3.75/1.25 |
| Example 13 | Decabromobiphenylether | 10 | (3.0) | 3/1 | 15/5.0 |
| | Brominated epoxy resin | 5 | | | |
| Comparative Example 14 | Decabromobiphenylether | 10 | (3.0) | 3/1 | .33/11 |
| | Brominated epoxy resin | 5 | | | |

| | Tracking Resistance CTI Volt | Arc Resistance (second) | Tensile Strength kg/cm² | Fire Retardancy UL - 94 (1/16") |
|---|---|---|---|---|
| Comparative Example 13 | 190 | 20 | 1100 | V - 0 |
| Example 12 | 250 | 62 | 1050 | V - 0 |
| Example 13 | 330 | 125 | 1010 | V - 0 |
| Comparative Example 14 | EXTRUSION WAS IMPOSSIBLE | | | |

EXAMPLES 14-16

To PTMT having an intrinsic viscosity $[\eta]$ of 0.82 was added polymethyl methacrylate (PMMA). Separately an AS resin having an acrylonitrile styrene weight ratio of 25/75 was blended with PTMT, and also polyethylene terephthalate (PET) having an intrinsic viscosity $[\eta]$ of 0.72 which was deterimined in the same manner as described for PTMT was blended with PTMT in the ratios shown in Table 6. To 100 parts by weight of each of the resultant mixtures were added 18 parts by weight of brominated epoxy resin having a bromination percentage of 51% and 6 parts (weight ratio 3.0) by weight of antimony trioxide. Furthermore, to each of the mixtures was added 30% by weight (based on the total resin composition) of glass fibers and hydrated silica or 30% by weight of glass fibers, 7% by weight of talc and hydrated silica in the ratios shown in Table 6. Each of the mixtures was extruded in the same manner as described in Example 1 to obtain the resulting compositions.

Each of the compositions was injection molded at a cylinder temperature of 260° C and a mold temperature of 100° C whereby molded products suitable for evaluation were obtained. The evaluation results of these products are shown in Table 6.

As is clear from the data in Table 6, the tracking resistance and arc resistance were excellent when the base polymer composition contained no more than 40% by weight of the non-PTMT polymer constituent.

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A reinforced fire retardant resin composition of improved electrical characteristics, which comprises: a base resin of polytetramethylene terephthalate alone or in admixture with at least one other polymer, a fire retardant combination of a halogen containing compound and an antimony compound, hydrated silica and a reinforcing filler, wherein said halogen containing compound is present in an amount of 3-50 parts by weight per 100 parts by weight of said base resin, said antimony compound is present in an amount such that the weight ratio of the halogen containing compound to the antimony compound ranges from 0.25 to 6 and the content of said hydrated silica ranges from 0.5 - 10 wt. % of the total resin composition.

2. The composition of claim 1, wherein the content of said reinforcing filler is 3 - 50% by weight of the total resin composition.

3. The composition of claim 1, wherein the reinforcing filler is glass fibers.

4. The composition of claim 1, wherein the reinforcing filler comprises talc and a second reinforcing filler in a weight ratio of talc/hydrated silica of 10/1 - ⅓ and wherein the content of the talc is 0.5-20% by weight of the total resin composition.

5. The composition of claim 4, wherein said second reinforcing filler is glass fibers.

6. The composition of claim 1, wherein the fire retarding halogen containing compound is at least one compound selected from the group consisting of cycloaliphatic hexabromobenzene, tetrabromobisphenol A and derivatives thereof; tetrabromophthalic anhydride; decabromodiphenylether; trisdibromophenyl phosphate; tris 2, 3 dibromopropyl phosphate; aliphatic cyclic compounds consisting of $C_{14}H_4Cl_{12}O$; $C_{17}H_8Cl_{12}$; $C_{18}H_{12}Cl_{12}$ and polymers consisting of brominated epoxy resins and brominated polyester resins.

7. The composition of claim 1, wherein the mixture of polytetramethylene terephthalate and said polymer comprises at least 60% by weight of said terephthalate and not more than 40% by weight of said polymer.

8. The composition of claim 7, wherein said polymer is selected from the group consisting of polystyrene, polymethyl methacrylate, polycarbonate, polyethylene terephthalate, ABS resin, AS resin, AAS resin, polyethylene, polypropylene and nylon resin.

9. The composition of claim 1, wherein said polytetramethylene terephthalate has an intrinsic viscosity of $[\eta]$ of 0.4-3.0 in a mixed solvent of equal amounts of tetrachloroethane/phenol at 25° C.

10. The composition of claim 1, wherein said hydrated silica is prepared by the said decomposition of sodium silicate or an alkaline earth metal silicate.

TABLE 6

| | Composition of polymer | | Amount of talc (weight %) | Amount of silica hydrated (weight %) | Tracking resistance CTI volt | Arc resistance (second) | Fire retardancy UL - 94 (1/16" thick) |
|---|---|---|---|---|---|---|---|
| | Blend polymer | PTMT/Blend polymer (weight ratio) | | | | | |
| Example 14 | PMMA | 80/20 | — | 5 | 250 | 65 | V - 0 |
| Example 15 | AS resin | 70/30 | 7 | 3 | 255 | 102 | V - 0 |
| Example 16 | PET | 60/40 | 7 | 3 | 260 | 110 | V - 0 |

* * * * *